United States Patent
Koripella

(10) Patent No.: US 7,335,432 B2
(45) Date of Patent: Feb. 26, 2008

(54) SOLID OXIDE FUEL CELL PORTABLE POWER SOURCE

(75) Inventor: Chowdary R. Koripella, Scottsdale, AZ (US)

(73) Assignee: Motorola, Inc., Schaumburg, IL (US)

( * ) Notice: Subject to any disclaimer, the term of this patent is extended or adjusted under 35 U.S.C. 154(b) by 473 days.

(21) Appl. No.: 10/837,183

(22) Filed: Apr. 30, 2004

(65) Prior Publication Data

US 2005/0244684 A1 Nov. 3, 2005

(51) Int. Cl.
*H01M 8/18* (2006.01)
*H01M 8/10* (2006.01)
*H01M 8/12* (2006.01)
*H01M 2/14* (2006.01)

(52) U.S. Cl. .................... 429/20; 429/31; 429/26; 429/38

(58) Field of Classification Search ............ 429/20, 429/26, 31, 38
See application file for complete search history.

(56) References Cited

U.S. PATENT DOCUMENTS

| | | |
|---|---|---|
| 5,034,287 A | 7/1991 | Kunz |
| 5,200,279 A | 4/1993 | Draper et al. |
| 5,827,620 A | 10/1998 | Kendall |
| 5,993,985 A | 11/1999 | Borglum |
| 6,230,494 B1 * | 5/2001 | Botti et al. .................... 60/649 |
| 6,492,050 B1 | 12/2002 | Sammes |
| 6,569,553 B1 | 5/2003 | Koripella et al. |
| 6,607,645 B1 | 8/2003 | Sarkar |
| 6,645,656 B1 | 11/2003 | Chen et al. |
| 6,677,070 B2 | 1/2004 | Kearl |
| 6,936,367 B2 * | 8/2005 | Sarkar et al. .................... 429/31 |
| 2003/0134169 A1 | 7/2003 | Sarkar et al. |
| 2003/0134176 A1 | 7/2003 | Sarkar |
| 2003/0194362 A1 | 10/2003 | Rogers et al. |
| 2003/0194363 A1 | 10/2003 | Koripella et al. |
| 2003/0235726 A1 | 12/2003 | Kelly et al. |
| 2003/0235734 A1 | 12/2003 | Haltiner, Jr. et al. |
| 2004/0018406 A1 | 1/2004 | Herman et al. |
| 2004/0247960 A1 * | 12/2004 | Sato et al. .................... 429/20 |

FOREIGN PATENT DOCUMENTS

WO WO 03/100881 A2 12/2003
WO WO 2004/004052 A2 1/2004

* cited by examiner

*Primary Examiner*—Mark Ruthkosky
*Assistant Examiner*—Karie O'Neill

(57) ABSTRACT

A ceramic fuel processor (10) including a solid oxide fuel cell (32) provides a high power output while maintaining a small size and minimizing heating issues. A fuel reformer (14) comprising a reaction zone (18) including a reforming catalyst. A heat source (28) is thermally coupled to the reaction zone for providing heat thereto. An inlet channel (20) conducts liquid fuel to the reaction zone, and an outlet channel (22) conducts hydrogen enriched gas from the reaction zone to the solid oxide fuel cell.

5 Claims, 4 Drawing Sheets

SOLID OXIDE FUEL CELL PORTABLE POWER SOURCE

FIELD OF INVENTION

The present invention generally relates to power sources and more particularly to a fuel processor and integrated solid oxide fuel cell fabricated utilizing ceramic technology for improved size, high energy, and performance benefits.

BACKGROUND OF THE INVENTION

Fuel cell systems for man-portable electrical power supplies, in general, are "battery replacements", or alternatively, provide a method for recharging a battery while powering an electronic device. Like batteries, fuel cells produce electricity through an electrochemical process, more specifically, a fuel cell produces electricity from fuel and air without combustion. The electrochemical process utilized provides for the combining of hydrogen, the fuel, with oxygen from the air. The process is accomplished utilizing an electrolyte, such as a polymer electrolyte membrane, which conducts ions, such as protons. The polymer electrolyte membrane is sandwiched between two electrodes, namely an anode, the negative electrode used for hydrogen oxidation, and a cathode, the positive electrode used for oxygen reduction. Fuel cells, as known, can perpetually provide electricity as long as fuel and oxygen are supplied. Hydrogen is typically used as the fuel in fuel cells for producing the electricity and it can be processed from methanol, natural gas, petroleum, ammonia, or stored in metal hydrides, carbon nanotubes, or as pure hydrogen.

There are several types of fuel cells, including hydrogen polymer electrolyte membrane cells, Reformed Hydrogen Fuel Cells (RHFCs), Direct Methnal Fuel Cells (DMFCs), and Solid Oxide Fuel Cells (SOFCs).

Hydrogen polymer electrolyte membrane cells are not as suitable for portable applications due to their size, and safety issues caused by carrying around highly volatile hydrogen. Power density of these fuel cells are in the range of 100-200 mW/cm$^2$, making them big for portable applications.

DMFCs have a low power density (typically 30 mW/cm$^2$), high precious metal cost, and are somewhat large for portable operations when more power is needed due to the low power density.

RHFCs utilize hydrogen fuel processed from liquid or gaseous hydrocarbon fuels, such as methanol, using a reactor, called a fuel reformer, for converting the fuel into hydrogen. Methanol is the preferred fuel for use in fuel reformers for portable applications because it is easier to reform into hydrogen gas at a relatively low temperature compared to other hydrocarbon fuels such as ethanol, gasoline, or butane. The reforming or converting of methanol into hydrogen usually takes place by one of three different types of reforming. These three types are steam reforming, partial oxidation reforming, and autothermal reforming. Of these types, steam reforming is the preferred process for methanol reforming because it is the easiest to control and produces a higher concentration of hydrogen output by the reformer, at a lower temperature, thus lending itself to favored use. However, RHFCs also have a low power density (typically 150 mW/cm$^2$) leading to a larger size, an additional reforming unit, and require precious metals, thereby increasing cost. RHFC also requires a low concentration of CO and unreacted hydrocarbons in the reformed gases, so with higher calorific value hydrocarbon fuels such as butane or ethanol, extensive cleanup of the reformed gases will be required. This makes the fuel processor complex and not suitable for portable power applications.

SOFCs comprise a pair of electrodes (anode and cathode) separated by a solid-phase electrolyte. Hydrogen or carbon monoxide pass over the anode reacting with oxygen ions conducted through the electrolyte to produce water and/or carbon dioxide and electrons. The electrons pass from the anode to an external circuit, through a load on the circuit, and back to the cathode where oxygen receives the electrons, thereby converting into oxygen ions which are injected into the electrolyte. SOFC devices may include tubular fuel cells having multiple concentric layers. Inner and outer layers may comprise, respectively for example, an anode and cathode. Fuel may be transmitted through the tube to the anode and oxygen may be supplied to the cathode from outside the tube. The tubes may be stacked so that the sum of the power from each provide a higher powered device. In SOFC, the anode, the electrolyte and the cathode layers can also be arranged in a planar design. However, in such an arrangement there need to be a gas tight seal all around the electrolyte, such that the gases can not leak from the anode side to the cathode side and vice versa. Since these fuel cells also require higher operating temperatures in the range of 700-800° C., accomplishing the seal with good thermal expansion matching of different materials is a major reliability concern. Such planar SOFC devices do not exhibit a thermal robustness. In tubular SOFC, this is less of a concern since the gases flow inside and outside of the tubes and the gas connections and sealing can be accomplished at a relatively cooler ends of the tubes. Such SOFC devices were shown to exhibit good thermal robustness. Tubular design is also volumetrically more efficient design, making it attractive for small fuel cells design in portable power applications.

Fuel reformers have been developed for use in conjunction with fuel cell devices, but they are typically cumbersome and complex systems consisting of several discrete sections connected together with gas plumbing and hardware to produce hydrogen gas, and are thus not suitable for portable power source applications. Recently fuel reformers have been developed, for hydrogen polymer electrolyte membrane cells, RHFCs, and DMFCs devices, utilizing ceramic monolithic structures in which the miniaturization of the reformer can be achieved. Utilizing multilayer laminated ceramic technology, ceramic components and systems are now being developed for use in microfluidic chemical processing and energy management systems. Monolithic structures formed of these laminated ceramic components are inert and stable to chemical reactions and capable of tolerating high temperatures. These structures can also provide for miniaturized components, with a high degree of electrical and electronic circuitry or components embedded or integrated into the ceramic structure for system control and functionality. Additionally, the ceramic materials used to form ceramic components or devices, including microchanneled configurations, are considered to be excellent candidates for catalyst supports and so are extraordinarily compatible for use in microreactor devices for generating hydrogen used in conjunction with miniaturized fuel cells.

Although these fuel reformers using hydrogen polymer electrolyte membrane cells, RHFCs, and DMFCs have shown how to provide power to recharge batteries in electronic devices, there is still a need for higher energy density power sources.

SUMMARY OF THE INVENTION

In various exemplary and representative aspects, one embodiment of the present invention comprises a ceramic fuel processor including a solid oxide fuel cell, provides a high power output while maintaining a small size and minimizing heating issues. A fuel reformer comprising a reaction zone including a reforming catalyst. A heat source is thermally coupled to the reaction zone for providing heat thereto. An inlet channel conducts liquid fuel to the reaction zone, and an outlet channel conducts hydrogen enriched gas from the reaction zone to the solid oxide fuel cell.

Additional advantages of the present invention will be set forth in the Detailed Description which follows and may be obvious from the Detailed Description or may be learned by practice of exemplary embodiments of the invention. Still other advantages of the invention may be realized by means of any of the instrumentalities, methods or combinations particularly pointed out in the claims.

BRIEF DESCRIPTION OF THE DRAWINGS

Representative elements, operational features, applications and/or advantages of the present invention reside in the details of construction and operation as more fully hereafter depicted, described and claimed—reference being made to the accompanying drawings forming a part hereof, wherein like numerals refer to like parts throughout. Other elements, operational features, applications and/or advantages will become apparent to skilled artisans in light of certain exemplary embodiments recited in the Detailed Description, wherein:

Those skilled in the art will appreciate that elements in the Figures are illustrated for simplicity and clarity and have not necessarily been drawn to scale. For example, the dimensions of some of the elements in the Figures may be exaggerated relative to other elements to help improve understanding of various embodiments of the present invention. Furthermore, the terms 'first', 'second', and the like herein, if any, are used for distinguishing between similar elements and not necessarily for describing a sequential or chronological order. Moreover, the terms front, back, top, bottom, over, under, and the like in the Description and/or in the claims, if any, are generally employed for descriptive purposes and not necessarily for comprehensively describing exclusive relative position. Skilled artisans will therefore understand that any of the preceding terms so used may be interchanged under appropriate circumstances such that various embodiments of the invention described herein, for example, are capable of operation in other orientations than those explicitly illustrated or otherwise described.

DETAILED DESCRIPTION OF EXEMPLARY EMBODIMENTS

Figure 1:
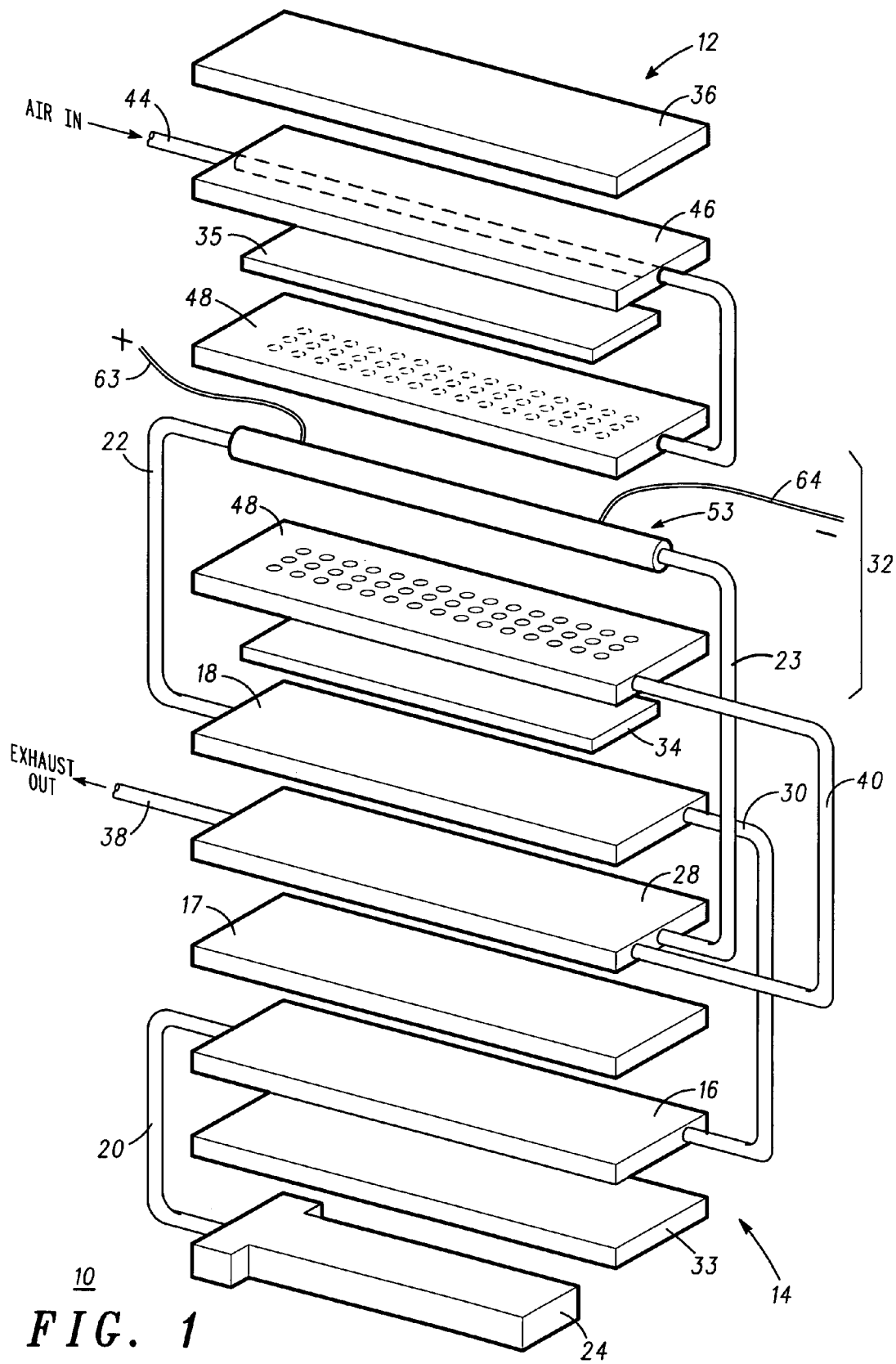
FIG. 1 illustrates a simplified orthogonal view of a fuel processor and integrated fuel cell stack including a plurality of fluidic channels according to an embodiment of the present invention.
Figure 2:
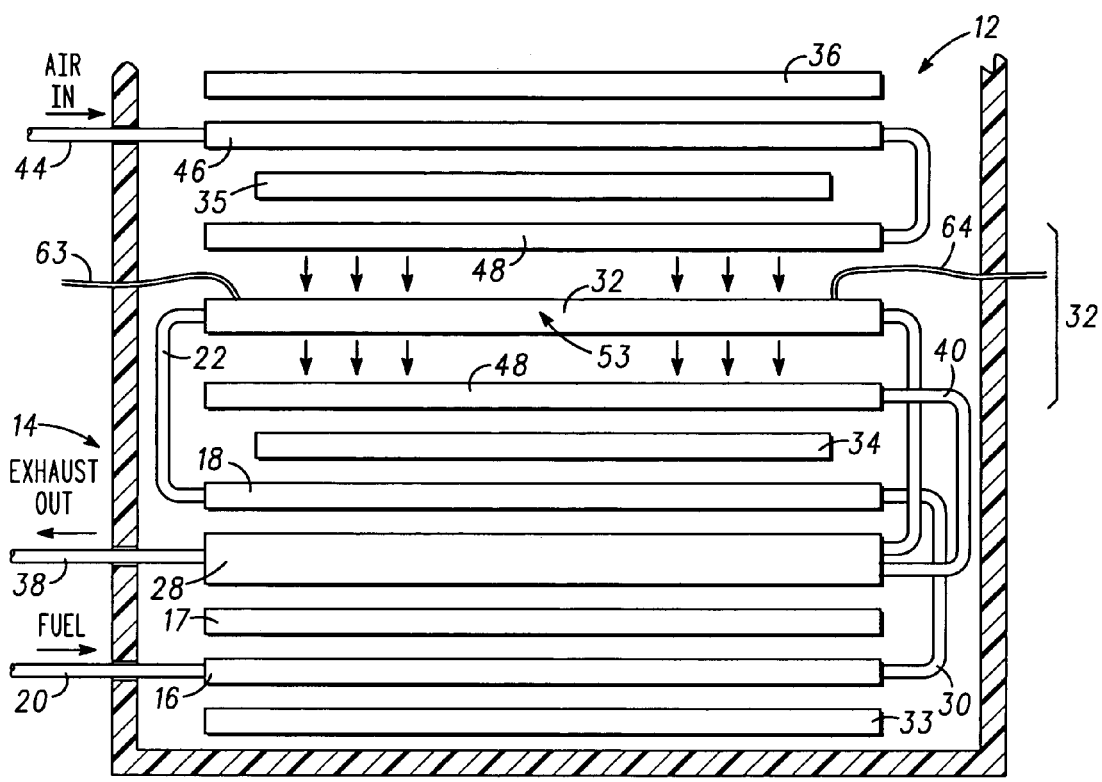
FIG. 2 illustrates a simplified sectional view of the fuel processor and integrated fuel cell stack of FIG. 1.

Referring to the drawings, and particular FIGS. 1 and 2, illustrated in simplified orthogonal view and simplified cross-sectional view, respectively, is a fuel processor 10 including a plurality of microfluidic channels in accordance with a preferred embodiment of the present invention. Fuel processor 10 is comprised of a three-dimensional multi-layer ceramic structure 12. Ceramic structure 12 is formed utilizing multi-layer laminate ceramic technology. Ceramic structure 12 of the size 1 cm wide, 6 cm long and 1 cm thick, for example, is typically formed using alumina green tape in component parts which are then sintered in such a way as to provide for a monolithic structure. Ceramic structure 12 has defined therein a fuel reformer, or fuel processor, generally referenced 14. Fuel reformer 14 includes a vaporization chamber, or vaporization zone 16, operating at about 100-200° C. range, a reaction chamber, or reaction zone 18 operating at about 200-300° C. for methanol reforming and about 500-600° C. for butane or ethanol reforming, and an integrated heat source, 28. The integrated heat source 28 described is a catalytic combustor, and includes a catalyst, for example, of Pt supported on alumina made into a thick film paste, and also comprises an electrical heater 17, made of thick film platinum, capable of heating the substrate to 300-400° C. during startup. Ceramic structure 12 further includes at least one fuel inlet channel 20 in communication with a liquid fuel source of a pure methanol source 24 and a hydrogen enriched gas outlet channel 22. The composition of the gases coming out of the outlet channel 22 comprises mainly hydrogen, and carbon dioxide. It also comprises small quantities of carbon monoxide (~1-3%) and unreacted hydrocarbon fuel (~1-3%). In the solid oxide fuel cell 50 (see FIG. 5) both hydrogen and carbon monoxide can be used as the fuel and any unutilized fuel will be combusted in the catalytic combustion chamber 28, before exhausting the gases out of the fuel processor 10.

During operation, heat is efficiently transferred from the central aspect of the device, more particularly from the integrated heater 28, to the reaction zone 18 and fuel vaporizer, or vaporization zone 16 using thermal conductive channels, or vias. In this particular embodiment, integrated heater 28 is described as a chemical heater, including a catalyst as described above, and arranged so as to oxidize fuel to produce heat, but it should be understood that the integration of an electrical heater 17 is provided for startup. Lightoff temperature for most of the hydrocarbon fuels are in the range of 100-300° C. over a combustion catalyst, and the electrical heater provides the initial heat for lightoff. Once the combustion process proceeds, the heat generated would make the catalyst active and there is no need to provide additional heating from the electrical heater. Chemical heater 28 includes an air port 40 for providing oxygen for oxidation of the pure methanol or other hydrocarbon fuels, and unused $H_2$ and CO, and the inlet channel 23 for providing fuel to heater 28. It should be understood that the air could be supplied from outside the ceramic structure 12.

Output from fuel vaporizer zone 16 travels via channel 30 to reaction zone 18 and then through hydrogen enriched gas outlet channel 22 to a fuel cell stack 32 to supply hydrogen fuel to fuel cell stack 32. Spent gases from the fuel cell stack 32 are directed through integrated heat source 28 to capture the heat from the spent gases.

An air inlet 44 provides outside air through a small blower to a heat exchanger 46 that captures some of the waste heat from below, and warms the air to approximately 300-400° C. before it is distributed to the fuel cell stack 32 via a plenum 48. Placement of this heat exchanger 46 in the outer layers helps in keeping the device slightly cooler and reduces the amount of insulation thickness required, and thereby increases the volumetric efficiency of the power source.

Efficient thermal insulators 33, 34, 35, 36 are positioned to keep outer temperatures low for packaging and also to keep heat localized to the fuel cell portion which needs to be maintained at the highest operating temperature (~800° C.) in the system. As illustrated in FIGS. 1 and 2, in this particular example, high temperature fuel cell stack 32 is integrated with fuel reformer 14. This particular fuel cell design allows for the operation of the fuel cell at a temperature of about 800° C. Fuel vaporizer zone 16 operates at a temperature ranging from 120-160° C. and the steam reforming reaction zone 18 operates at a temperature ranging from 200-300° C. for methanol (400-600° C. for ethanol or butane).

Additionally, in this particular embodiment of fuel processor 10, included is an exhaust gas vent 38, for the venting of exhaust gases generated by device 10.

Figure 4:
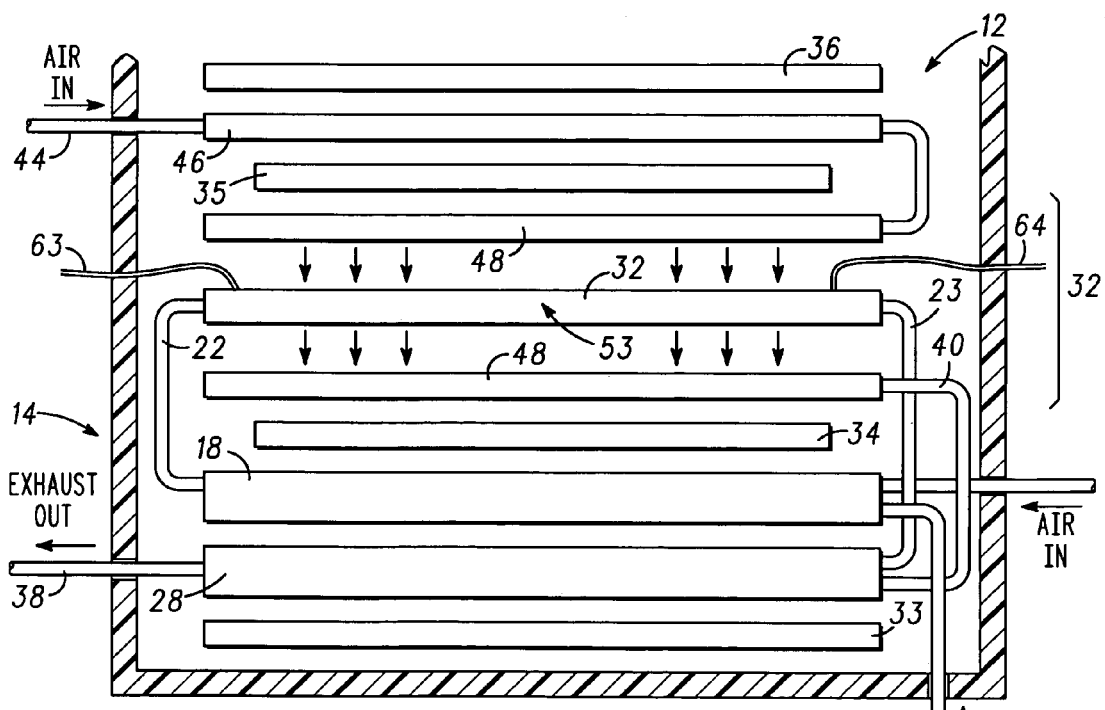
FIG. 4 illustrates a simplified sectional view of the fuel processor and integrated fuel cell stack of FIG. 3.
Figure 3:
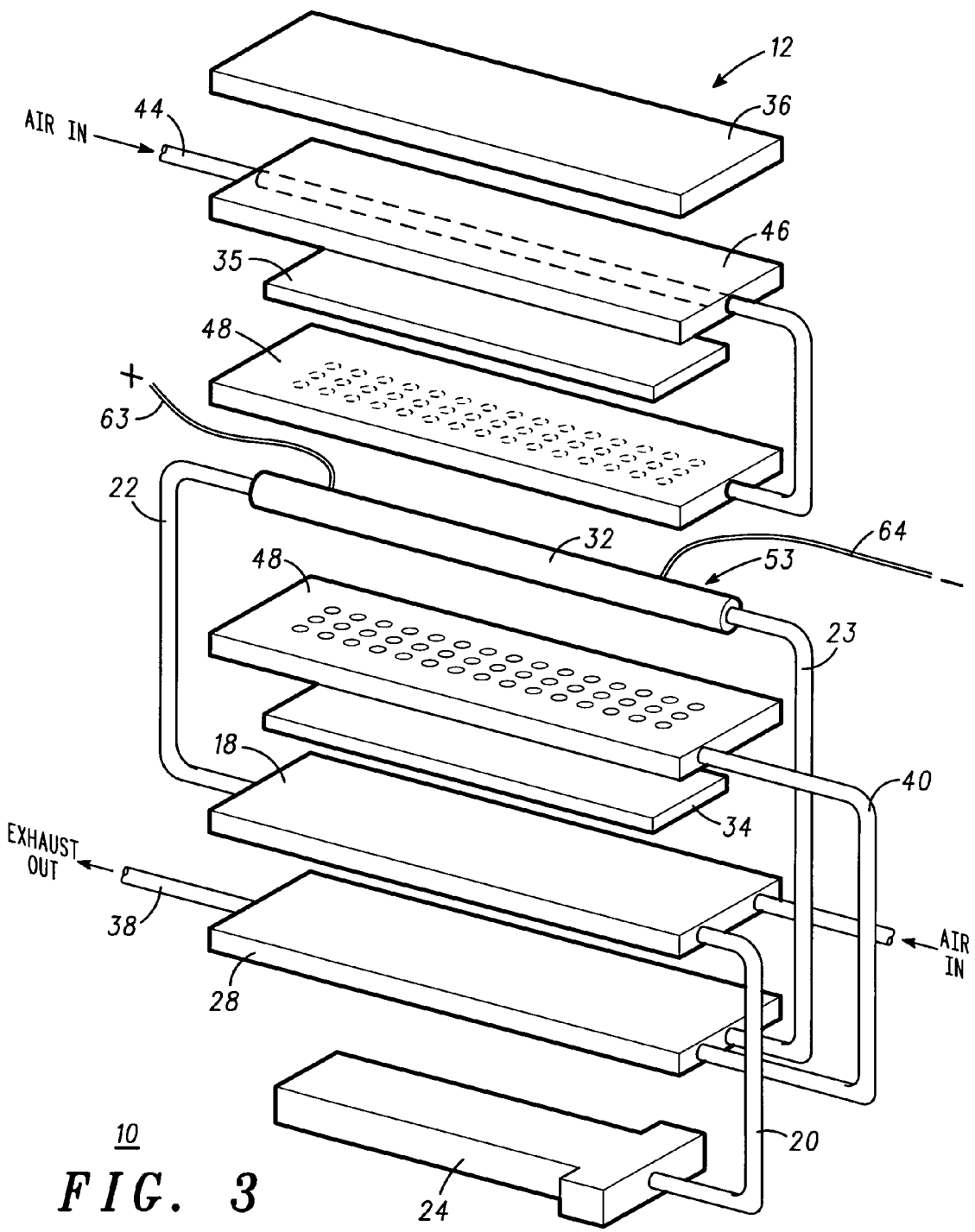
FIG. 3 illustrates a simplified orthogonal view of a fuel processor and integrated fuel cell stack including a plurality of fluidic channels according to another embodiment of the present invention.

Referring to FIGS. 3 and 4, the fuel processor 10 may alternatively use butane instead of methanol. The fuel processor 10 would then not require the vaporization zone 16. Butane would then flow directly to the reaction zone 18 via the fuel inlet channel 20.

With methanol or ethanol fuels, a means of delivering the liquid fuel to the fuel processor 10 needs to be designed. It can be accomplished with active pumping from a fuel tank, but it requires small pumps and consume some of the power generated thereby reducing the overall system efficiency. Alternatively a passive means of delivering the fuel to the fuel processor can be accomplished using a porous wick and capillaries. With butane as the fuel, this would not be a problem since the vapor pressure of butane is low and it would flow as a gas to the fuel processor as soon as an inlet valve is released.

It should be understood that alternative embodiments encompassing: (i) alternative fuel delivery means, either passive or active pumping; (ii) fuel vaporizer, reaction zone, and chemical heater positions; and (iii) a fuel reformer device without an integrated fuel cell, are anticipated by this disclosure. In particular, anticipated is an embodiment in which only a single fuel supply, namely methanol and water, is anticipated. This use of a single methanol and water solution would enable the fabrication of a simpler design, without any need for the device to incorporate two fuel tanks. Although it is understood that pure methanol is more efficient and preferred with respect to the chemical heater, a one mole water and one mole methanol solution will also work, but is not deemed literally as operationally efficient. Further, a heater using the water and methanol solution is suitable for practical applications, and would permit a simple common fuel reservoir for feeding the heater and reformer chambers. In this instance, the fuel delivery would be split into two chambers, the chemical heater 28 and fuel vaporizer 16.

Next, anticipated are variations on the actual design of device 10 and more particularly to the actual location of the fuel vaporizer zone 16, reaction zone 18 and chemical heater 28. In one particular alternative embodiment, it is anticipated that reaction zone 18 surrounds the chemical heater 28 on both sides (top and bottom). In yet another alternative embodiment, it is anticipated that reaction zone 18 can be positioned below heater 28 and the fuel vaporizer zone 16 on top of the chemical heater 28.

Figure 5:
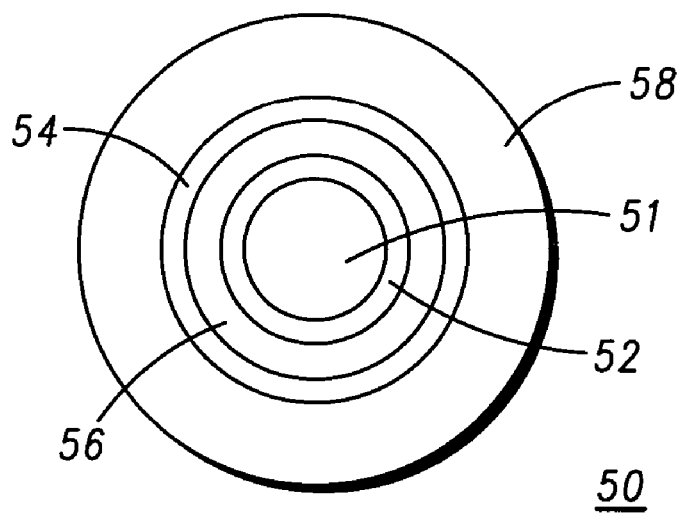
FIG. 5 illustrates a simplified schematic view of a single fuel cell as used in FIGS. 1-4.

Referring to FIG. 5, a single solid oxide fuel cell 50 of the type that may be used with the fuel processor 10 comprises three concentric hollow inorganic membranes. The inner and outer membranes 52 and 54 function as electrodes (anode and cathode, respectively) while the middle membrane 56 functions as an electrolyte. To serve as electrodes, the inner and outer membranes 52 and 54 are made of a material that is porous, catalytic, and electrically and ionically conductive. This enables the electrodes to collect electrical current, to allow reactant to flow to the electrolyte, to encourage electro-chemical reactions, and to conduct ions that permeate through the electrolyte 54. The inner electrode 52 may comprise a nickel and zirconia cermet, while the outer electrode 54 may comprise lanthanum strontium manganate. The middle membrane may comprise a zirconia ceramic material. The fuel cell 50 may be embedded in a foam-like porous conductive material 58 for supporting the thin walled membranes 52, 54, and 56, and which may be surrounded by a container 60. Such a solid oxide fuel cell is disclosed in U.S. Patent Publication Number 2003/0134169.

Figure 6:
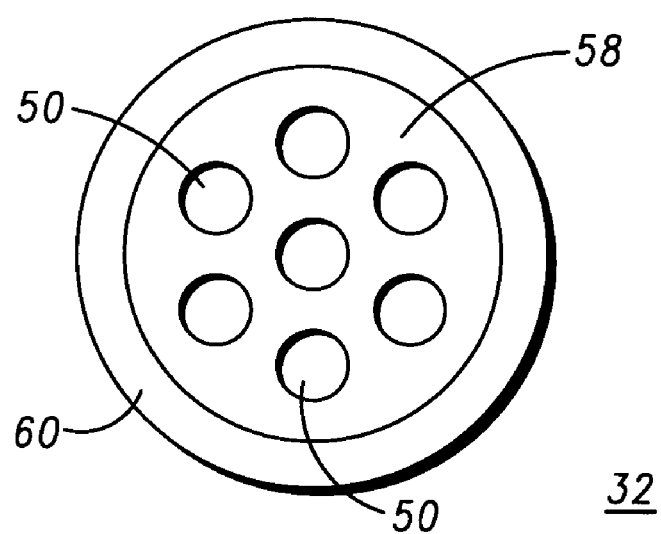
FIG. 6 illustrates a simplified schematic view of fuel cell stacks comprising a plurality of tubular fuel cells embedded in a matrix.

Referring to FIG. 6, a fuel cell stack 32 is shown that comprises a plurality of fuel cells 50. Stacking the fuel cells 50 in this manner provides for a higher power density while minimizing the space required.

The fuel cell operates by having the hydrogen fuel, from outlet channel of either of the methanol (FIGS. 1 and 2) or butane (FIGS. 3 and 4) reactor embodiments as described above, flow to the fuel cell stack 32 and thereby through the inside of the inner membrane 52 (anode) of each fuel cell 50. The fuel permeates through the porous anode support 51 and through the membrane 52. Air is provided from air inlet 44, after being heated in heat exchange 46, to plenum 48 which distributes it evenly as an oxidant over the fuel cell stack 32 and through the porous conductive material 58 to the outer membrane 54 (cathode). Unused air is fed to the combustor 28 and exhausted out through outlet 38. An electrical current generated by the electrochemical reaction in each fuel cell 50 is collected by the porous conductive material 58 from the outer membrane 54 and from the porous anode support 51 and transmitted to the ends of each fuel cell 50. The mesh type porous conductive material 58 and the porous anode support 51 provides the current to output terminals 63 and 64.

The higher power density of the solid oxide fuel cells (1-2 W/cm$^2$) and the robustness of the micro solid fuel cell tubes 50, combined with the stability of the ceramic fuel processor 14 provides a small power source yielding a higher power output suitable for portable electronic devices. In the present invention, only the fuel cell middle section 53 needs to be at the highest operating temperature. By selectively placing this small hot zone in the middle of the ceramic structure 12 and using a tubular solid oxide fuel cell design which is volumetrically more efficient, the over all power source can be effectively insulated into a small volume power source suitable of portable power applications.

In the foregoing specification, the invention has been described with reference to specific exemplary embodiments; however, it will be appreciated that various modifications and changes may be made without departing from the scope of the present invention as set forth in the claims below. The specification and figures are to be regarded in an illustrative manner, rather than a restrictive one and all such modifications are intended to be included within the scope of the present invention. Accordingly, the scope of the invention should be determined by the claims appended hereto and their legal equivalents rather than by merely the examples described above. For example, the steps recited in any method or process claims may be executed in any order and are not limited to the specific order presented in the claims. Additionally, the components and/or elements recited in any apparatus claims may be assembled or otherwise operationally configured in a variety of permutations to produce substantially the same result as the present invention and are accordingly not limited to the specific configuration recited in the claims.

Benefits, other advantages and solutions to problems have been described above with regard to particular embodiments; however, any benefit, advantage, solution to problems or any element that may cause any particular benefit, advantage or solution to occur or to become more pronounced are not to be construed as critical, required or essential features or components of any or all the claims.

As used herein, the terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted by those skilled in the art to specific environments, manufacturing specifications, design parameters or other operating requirements without departing from the general principles of the same.

The invention claimed is:

1. An integrated system including a fuel processor, comprising:
    a reforming catalyst;
    two electrodes providing an output current; and
    a monolithic structure consisting of a sintered thee-dimensional multi-layer ceramic material defining:
        a fuel inlet channel;
        a vaporization chamber coupled to the fuel inlet channel;
        a reaction zone chamber coupled to the vaporization chamber;
        at least one microchannel coupled to the reaction zone chamber;
        an air inlet channel;
        a heat exchanger chamber coupled to the air inlet channel;
        a porous material coupled to the heat exchanger chamber and disposed proximate to both the heat exchanger chamber and the reaction zone chamber;
        a plurality of tubular fuel cells, each tubular fuel cell having a cylindrical outer side comprising a cathode surrounded by the porous material, and a cylindrical inner side comprising an anode coupled to the at least one microchannel, the plurality of tubular fuel cells coupled to the two electrodes; and
        a heat source chamber having the reforming catalyst disposed therein and coupled to the porous material and the anode, the heat source chamber disposed proximate to the reaction zone chamber and the vaporization chamber.

2. The ceramic fuel processor according to claim 1 wherein the heat source chamber comprises a catalytic combustor.

3. The ceramic fuel processor according to claim 1 wherein the heat source chamber comprises an electric heater.

4. The ceramic fuel processor according to claim 1 wherein the tubular fuel cells each comprise an inner membrane serving as the anode, an outer membrane serving as the cathode, and a middle membrane serving as an electrolyte.

5. The ceramic fuel processor according to claim 1 further comprising at least one insulator layer positioned adjacent to the porous material for reducing the amount of heat escaping from the tubular fuel cells.

* * * * *

UNITED STATES PATENT AND TRADEMARK OFFICE
CERTIFICATE OF CORRECTION

PATENT NO. : 7,335,432 B2
APPLICATION NO. : 10/837183
DATED : February 26, 2008
INVENTOR(S) : Koripella It is certified that error appears in the above-identified patent and that said Letters Patent is hereby corrected as shown below:

IN THE CLAIMS

In Column 7, Lines 39-40, in Claim 1, delete "thee-dimensional" and insert -- three-dimensional --, therefor.

Signed and Sealed this

Fourteenth Day of July, 2009

JOHN DOLL
*Acting Director of the United States Patent and Trademark Office*